(12) United States Patent
Imanishi et al.

(10) Patent No.: US 7,563,192 B2
(45) Date of Patent: Jul. 21, 2009

(54) TOROIDAL-TYPE CONTINUOUSLY VARIABLE TRANSMISSION

(75) Inventors: Takashi Imanishi, Kanagawa (JP);
Kazuya Kimura, Kanagawa (JP);
Sachiko Sekiguchi, Kanagawa (JP)

(73) Assignee: NSK Ltd., Tokyo (JP)

( * ) Notice: Subject to any disclaimer, the term of this patent is extended or adjusted under 35 U.S.C. 154(b) by 201 days.

(21) Appl. No.: 10/607,217

(22) Filed: Jun. 27, 2003

(65) Prior Publication Data

US 2005/0064985 A1    Mar. 24, 2005

(51) Int. Cl.
*F16H 15/38*    (2006.01)

(52) U.S. Cl. .............................. 476/8; 384/473; 476/40; 476/46

(58) Field of Classification Search ............. 476/8, 476/40, 42, 46; 384/473; 261/DIG. 40
See application file for complete search history.

(56) References Cited

U.S. PATENT DOCUMENTS

| | | | | |
|---|---|---|---|---|
| 4,183,591 | A | * | 1/1980 | Mayer ......................... 384/473 |
| 5,099,710 | A | | 3/1992 | Nakano |
| 5,139,673 | A | * | 8/1992 | Martin ......................... 210/463 |
| 5,286,240 | A | | 2/1994 | Kobayashi |
| 5,382,099 | A | * | 1/1995 | Bauer et al. .................. 384/454 |
| 5,830,103 | A | | 11/1998 | Itoh et al. |
| 6,203,467 | B1 | * | 3/2001 | Yamamoto et al. ............. 476/8 |

FOREIGN PATENT DOCUMENTS

| | | |
|---|---|---|
| JP | 62-156658 U | 10/1987 |
| JP | 5-39850 | 2/1993 |
| JP | 8-291850 | 11/1996 |
| JP | 2629786 | 4/1997 |
| JP | 9-317838 | 12/1997 |
| JP | 2734583 | 1/1998 |
| JP | 10-132045 | 5/1998 |
| JP | 11051141 | 2/1999 |
| JP | 11-182647 | 7/1999 |
| JP | 11210855 | 8/1999 |
| JP | 2000-346159 | 12/2000 |
| JP | 2001-132808 | 5/2001 |
| JP | 3376910 | 12/2002 |

OTHER PUBLICATIONS

U.S. Appl. No. 09/695, 906.

* cited by examiner

*Primary Examiner*—William C Joyce
(74) *Attorney, Agent, or Firm*—Sughrue Mion, PLLC (57) ABSTRACT

A toroidal-type continuously variable transmission has a pair of input and output disks each including a first traction surface, power rollers each including a second traction surface and respectively interposed between the first traction surfaces of the input and output disks, an oil passage for guiding lubricating oil to the traction surfaces of the power rollers, input disk and output disk, and a mesh filter disposed on the exit side of the associated oil passage.

7 Claims, 11 Drawing Sheets

TOROIDAL-TYPE CONTINUOUSLY VARIABLE TRANSMISSION

BACKGROUND OF THE INVENTION

1. Field of the Invention

The present invention relates to a toroidal-type continuously variable transmission which can be used, for example, as a transmission for a vehicle.

2. Description of the Related Art

As an automatic transmission for a vehicle, there is conventionally used a toroidal-type continuously variable transmission.

In this type of toroidal-type continuously variable transmission, as shown in U.S. Pat. Nos. 5,099,710 or 5,286,240, there is used a structure in which a pair of input and output disks are combined together on the two sides of a set of power rollers so as to hold the power rollers. Specifically, the traction surfaces of the respective disks are formed in a convex-surface shape obtained by an arc, the center of which is the swing shaft of the power roller; and, in case where the power rollers are inclinedly rotated, the rotation radius ratio of the contact points between the power rollers and input and output disks is changed to thereby change gears.

In the toroidal-type continuously variable transmission, in order to secure the traction property, the power transmission between the input and output disks and power rollers is carried out in the following manner. That is, there are interposed oil films respectively between the traction surfaces of the input and output disks and the traction surfaces of the power rollers, and the power is transmitted by the shear forces of the oil films.

Therefore, in a variator which is composed of power rollers and input and output disks, there is employed a lubricating system which is peculiar to the toroidal-type continuously variable transmission and in which lubricating oil is finally sent out onto the traction surfaces of the toroidal-type continuously variable transmission input and output disks.

Conventionally, in this lubricating system, on the lower side of the variator, there is formed an oil collecting portion in which the lubricating oil can collect and, in the variator, there are formed a plurality of oil passages through which the lubricating oil can pass. And, the lubricating oil flowing out from the oil passages is allowed to flow to the traction surfaces of the input and output disks or to flow to the traction surfaces of the power rollers.

For example, as typically disclosed in JP-A-11-51141 and JP-A-11-210855, there is employed a structure in which, on the upper or lower side of the input and output disks, there formed injection holes respectively facing the traction surfaces of the respective disks and the lubricating oil is jetted out directly to the traction surfaces of the disks. In this type of toroidal-type continuously variable transmission, in order to maintain the stable lubricating performance, it is necessary to avoid the possibility that a foreign substance mixed into the lubricating oil can be bitten into the surface rolling contact points between the respective disks and power rollers.

In view of this, conventionally, in the toroidal-type continuously variable transmission, there is employed a structure in which a line filter is incorporated into the suction side of an oil pump to thereby remove foreign substances of a given size or larger.

However, sometimes, the line filter disposed on the suction side is unable to remove the foreign substances fully.

For example, in case where foreign substances such as dust slip into the oil passages respectively extending from the line filter to the injection holes in the assembling operation of the toroidal-type continuously variable transmission, or in case where burrs produced in the hole working operation remain in the openings of the oil passages, these foreign substances are jetted out onto the traction surfaces of the respective disks and the traction surfaces of the power rollers before they pass through the line filter.

Also, foreign substances made of metal remaining in the oil of an oil pan, sometimes, cannot be removed fully by the line filter but they are jetted out onto the traction surfaces.

In these cases, there is a fear that the foreign substances can be bitten into the rolling contact points between the disks and power rollers. And, even in case where the foreign substances are not bitten into the rolling contact points but are stored together with the lubricating oil on the lower side of the variator, there is a fear that the foreign substances in the oil (including foreign substances which have been previously present in the lubricating oil collecting in the oil collecting portion) can be caused to move violently due to the vibrations of the composing parts of the toroidal-type continuously variable transmission while it is in operation and can be bitten, together with the lubricating oil which is stored in the oil collecting portion and is scraped up by the disks, into the traction surfaces of the disks and power rollers again.

Such biting of the foreign substances reduces the lives of the input and output disks and power rollers.

SUMMARY OF THE INVENTION

Accordingly, it is a first object of the present invention to provide a toroidal-type continuously variable transmission which can remove the foreign substances existing in the block ranging from the line filter to the injection holes before they are jetted out onto the traction surfaces of the input and output disks and power rollers.

And, it is a second object of the present invention to provide a toroidal-type continuously variable transmission which can remove the metal-made foreign substances that cannot be removed by the line filter.

Also, it is a third object of the present invention to provide a toroidal-type continuously variable transmission which can scrape up the foreign substances from the oil collecting portion onto the traction surfaces.

In attaining the above objects, according to the present invention, there is provided a toroidal-type continuously variable transmission has a pair of input and output disks each including a first traction surface, power roller search including a second traction surface and respectively interposed between the first traction surfaces of the input and output disks, an oil passage for guiding lubricating oil to the traction surfaces of the power rollers, input disk and output disk, and a mesh filter disposed on the exit side of the associated oil passage.

Preferably, the toroidal-type continuously variable transmission may further include a magnet member disposed in the associated oil passage.

Preferably, the toroidal-type continuously variable transmission may further include an oil collecting portion disposed below the power rollers and input and output disks, and cover members respectively disposed so as to cover the lower portions of the associated input and output disks.

Preferably, the toroidal-type continuously variable transmission may further include a plurality of trunnions respectively swingable about the associated trunnion shafts disposed at twisted positions with respect to the center axes of the input and output disks, a pair of links for connecting together the associated trunnions, a support post for supporting the associated link so as to be shifted, a stopper for restricting the movements of the associated trunnions, a bolt member for fixing the associated stopper to the support post and including a hole extended from the leading end of the shaft portion thereof near to the head portion thereof, and an injection head fixed by the associated bolt member together with the associated stopper and including an injection hole in the outer peripheral surface thereof, wherein each of the oil passages is formed in the associated bolt member and each of the mesh filters is mounted on a step formed in a hole portion formed in the bolt member.

Preferably, the toroidal-type continuously variable transmission may further include a magnet member disposed in the oil passage of the bolt member.

Preferably, the toroidal-type continuously variable transmission may further include displacement shafts for supporting the associated power roller rotatably and each including a passage and an injection hole, wherein the oil passage is the passages of the associated displacement shafts, and the mesh filter is mounted on a step formed in a hole portion situated near to the injection hole of the associated passage.

Preferably, the magnet member is disposed in the passages of the associated displacement shafts.

Preferably, the toroidal-type continuously variable transmission may further include a drive shaft member, wherein the oil passage is formed in the drive shaft member and the mesh filter is mounted on the leading end of the drive shaft member.

Preferably, the toroidal-type continuously variable transmission may further include an input shaft, wherein the magnet member is disposed on the input shaft.

A toroidal-type continuously variable transmission has a pair of input and output disks each including a first traction surface, power rollers each including a second traction surface and respectively interposed between the first traction surfaces of the input and output disks, an oil passage for guiding lubricating oil to the traction surfaces of the power rollers, input disk and output disk, and a magnet member disposed in the associated oil passages.

Preferably, the toroidal-type continuously variable transmission may further include a plurality of trunnions respectively swingable about the associated trunnion shaft disposed at twisted position with respect to the center axes of the input and output disks, a pair of links for connecting together the associated trunnions, a support post for supporting the associated pair of links so as to be shifted, a stopper for restricting the movement of the associated trunnion, a bolt member for fixing the associated stopper to the associated support post and each including a hole extended from the leading end of the shaft portion thereof near to the head portion thereof, and a injection head fixed by the associated bolt member together with the associated stopper and including an injection hole in the outer peripheral surface thereof, wherein the oil passage is formed in the associated bolt member and a magnet member is disposed in the oil passage of the associated bolt member.

Preferably, the toroidal-type continuously variable transmission may further include an oil collecting portion formed below the power rollers and input and output disks, and a cover member for covering the lower portion of the associated input and output disks.

A toroidal-type continuously variable transmission has a pair of input and output disks each including a first traction surface, power rollers each including a second traction surface and respectively interposed between the first tractions of the input and output disks, an oil collecting portion formed below the power rollers and input and output disks, and a cover member disposed so as to cover the lower portions of the associated input and output disks.

DETAILED DESCRIPTION OF THE PREFERRED EMBODIMENTS

Now, description will be given below of the present invention with reference to a first embodiment shown in FIGS. 1 to 7.

Figure 1:
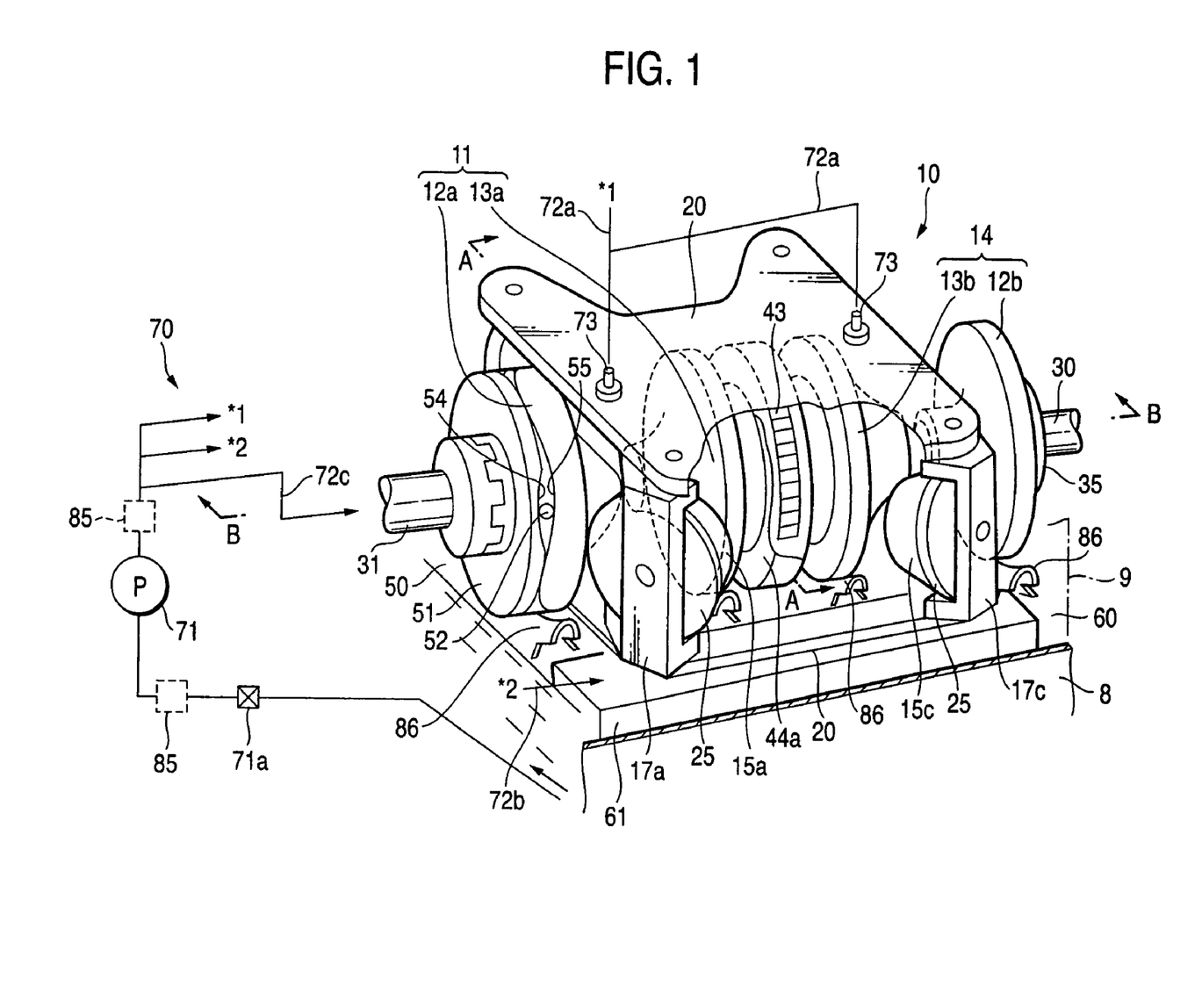
FIG. 1 is a perspective view of the outer appearance of the main portions of a toroidal-type continuously variable transmission according to the present invention.
Figure 2:
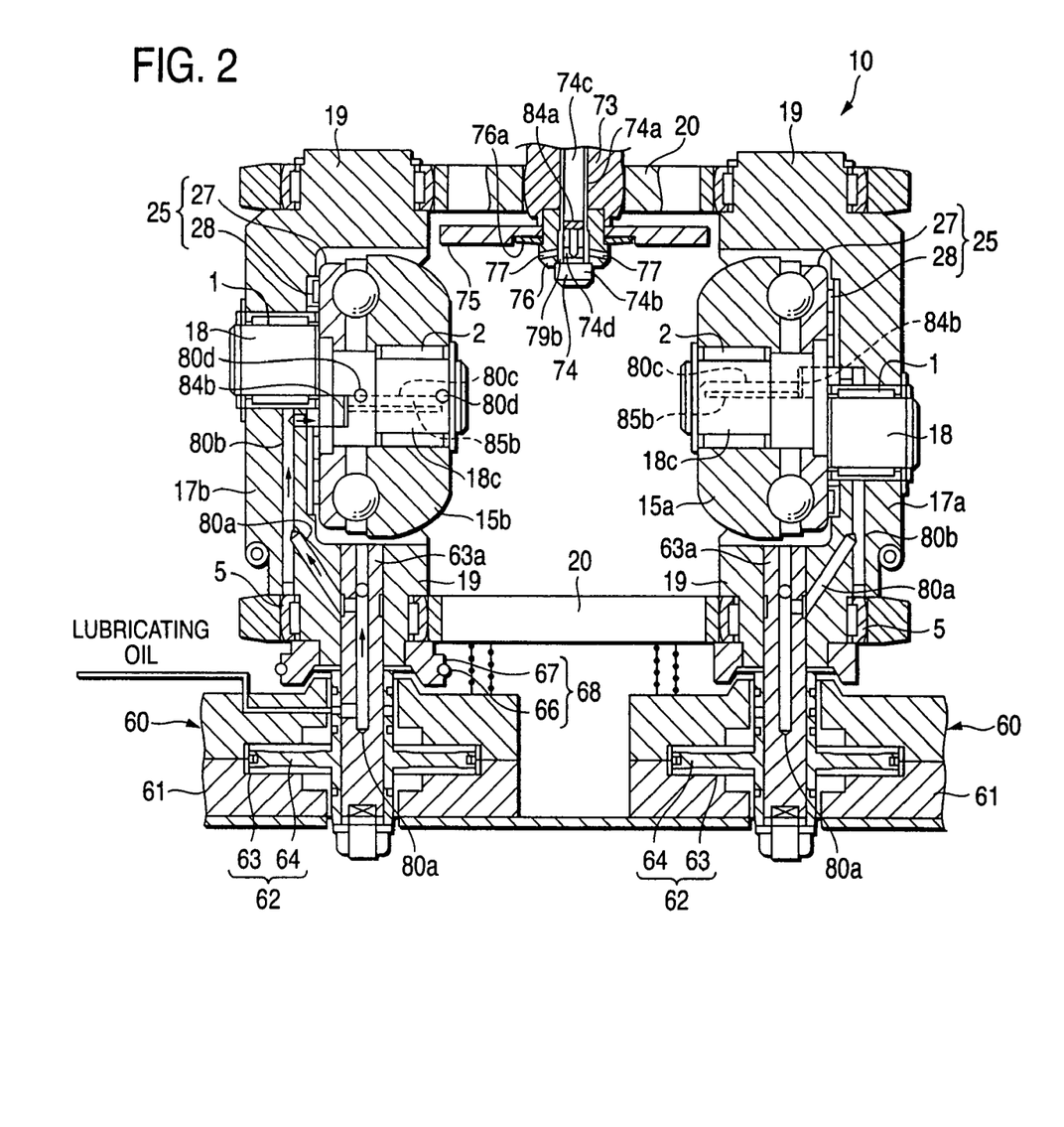
FIG. 2 is a section view taken along the line A-A shown in FIG. 1.
Figure 3:
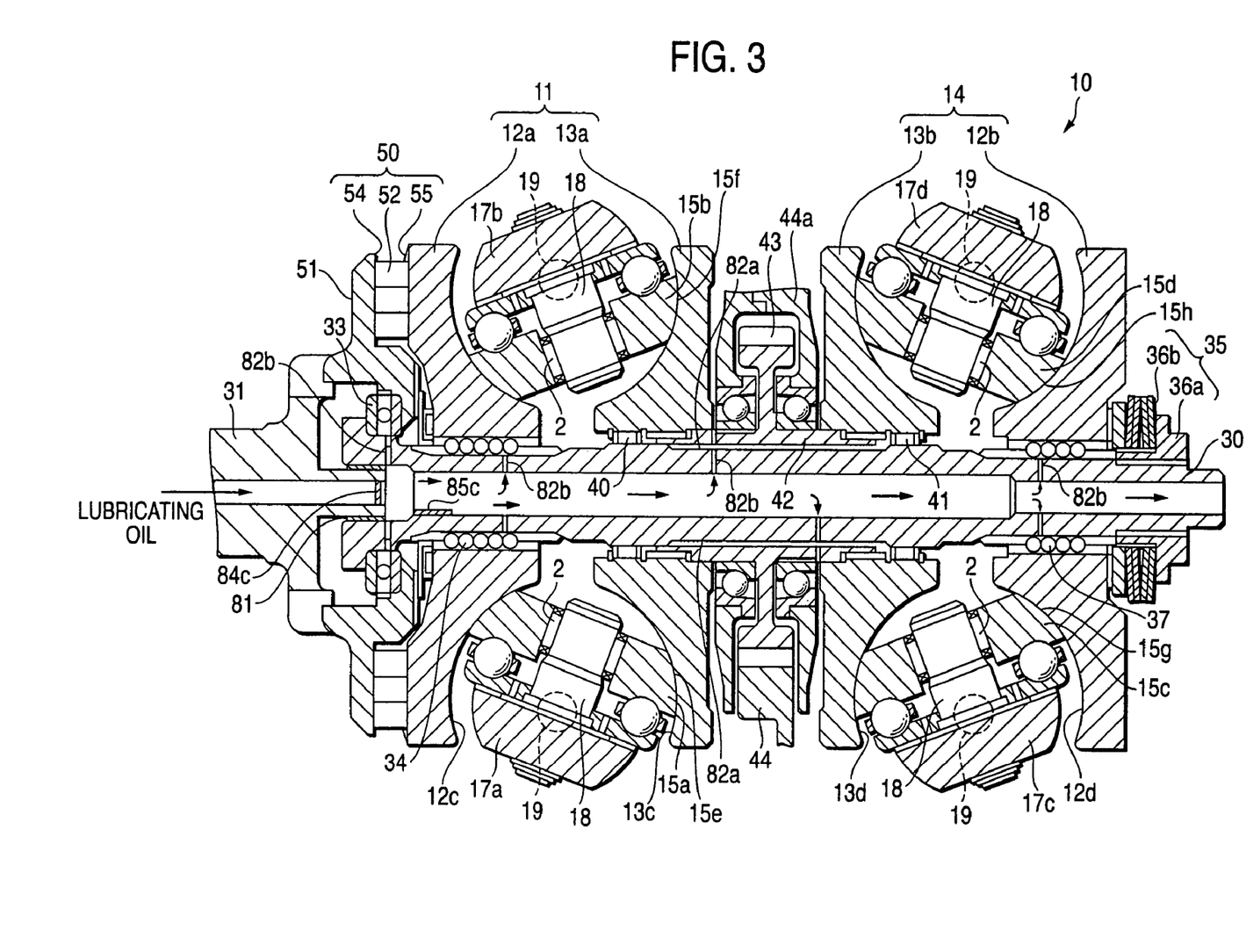
FIG. 3 is a section view taken along the line B-B shown in FIG. 1.

FIG. 1 shows a variator 10 constituting the main part of a half-toroidal-type continuously variable transmission of a double cavity type according to the present invention, FIG. 2 shows a section view taken along the line A-A shown in FIG. 1, and FIG. 3 shows a section view taken along the line B-B shown in FIG. 1. The variator 10 is stored in a mission case (part of which is shown by a two-dot chained line in FIG. 1) with an oil pan part 8 (as a oil collecting portion collecting the lubricating oil) formed in the lowest portion thereof. The variator 10 comprises an input disk 12a and an output disk 13a constituting a first cavity 11, and an input disk 12b and an output disk 13b constituting a second cavity 14. The input disks 12a, 12b and output disks 13a, 13b respectively include first traction surfaces 12c, 12d, 13c, 13d on the inner surfaces thereof.

And, between the input and output disks 12a, 13a, there are interposed a pair of (here, two) power rollers 15a, 15b. By the way, the power rollers 15a, 15b respectively include second traction surfaces 15e, 15f on the outer peripheral surfaces thereof, while the second traction surfaces 15e, 15f are to be held by and between the first traction surfaces 12c, 13c of the input and output disks 12a, 13a. Also, between the input and output disks 12b, 13b as well, there are interposed a pair of (here, two) power rollers 15c, 15d. By the way, the second traction surfaces 15g, 15h of the power rollers 15c, 15d are to be held by and between the first traction surfaces 12d, 13d of the input and output disks 12b, 13b.

The power rollers 15a, 15b, as shown in FIG. 2, are rotatably mounted through their associated needle roller bearings 2 on crank-shaped displacement shafts 18 which are rotatably fitted with trunnions 17a, 17b through their associated needle roller bearings 1. The power rollers 15c, 15d, similarly to the power rollers 15a, 15b, are rotatably mounted through their associated needle roller bearings 2 on crank-shaped displacement shafts 18 which are rotatably fitted with trunnions 17c, 17d through their associated needle roller bearings 1.

The trunnions 17a-17d, as shown in FIG. 2, respectively include a pair of trunnion shafts 19 in the upper and lower portions thereof holding the power rollers 15a-15d between them. The trunnion shafts 19 are disposed at twisted positions with respect to the center axes of the input and output disks, while the respective trunnions 17a-17d can be swung about their associated trunnion shafts 19. The trunnions 19 are connected by two frame-shaped links 20 in such a manner that they face each other on a diagonal line; and thus, reaction forces to be generated when the power rollers 15a-15d are pressed against the trunnions 17a-17d can be cancelled. However, the leading end portion and root portion of each of the trunnion shafts 19 are supported using bearing portions 5 in such a manner that they can be rotated and swung with respect to the upper and lower links 20.

The power rollers 15a-15d and their associated trunnions 17a-17d are supported and connected together through their associated power roller bearings 25 each of which is composed of a combination of a thrust ball bearing 27 and a thrust bearing 28, thereby providing a structure which can withstand thrust forces to be generated when the power rollers 15a-15d are pressed.

Also, as shown in FIG. 3, an input shaft 30 composed of a hollow shaft is disposed so as to penetrate through the center portions of the input disks 12a, 12b and output disks 13a, 13b. One end portion of the input shaft 30 is connected through a rolling bearing 33 and a cam disk 51 to a drive shaft member 31 which is coaxial with the input shaft 30. By the way, the drive shaft member 31 is a member to which a drive force from a drive source such as an engine (not shown) can be input.

The input shaft 30 includes a ball spline 34 in one end portion thereof and a ball spline 37 and an elastic receiving device 35 (which is composed of a loading nut 36a, a countersunk spring 36b and the like) in the other end portion thereof. And, the input disk 12a is mounted in such a manner that it can be moved in the axial direction with respect to the input shaft 30 while it is prevented against rotation by the ball spline 34. The input disk 12b, similarly, is mounted in such a manner that it can be moved in the axial direction with respect to the input shaft 30 while it is prevented against rotation by the ball spline 37.

The output disks 13a, 13b are respectively interposed between the input disks 12a, 12b in such a manner that the output disk 13a faces the input disk 12a and the output disk 13b faces the input disk 12b. These output disks 13a, 13b are respectively supported on the outer peripheral portion of the input shaft 30 through their associated bearings 40, 41 in such a manner that they can be rotated. The two output disks 13a, 13b are connected together by a cylindrical-shaped connecting member 42 which is interposed between the two output disks. And, the rotational movements of the output disks 13a, 13b can be output from an output gear 43 which is disposed on the outer peripheral portion of the connecting member 42. A gear 44 disposed on an output shaft (not shown) is meshingly engaged with the output gear 43. By the way, reference character 44a designates a housing which covers the periphery of the output gear 43.

To the back surface side of the input disk 12a, there is assembled a loading cam mechanism 50. The loading cam mechanism 50 comprises cam surfaces 54, 55 respectively formed on the side surface of the cam disk 51 and the back surface of the input disk 12a which face each other, and a roller 52 held by and between these cam surfaces 54, 55.

According to the present structure, in case where the drive shaft member 31 is rotated, the cam disk 51 is rotated and, due to a wedge action provided by the roller 52 held by and between the cam surfaces 54, 55, the input disk 12a is rotated together with the cam disk 51 while it is pressed toward the output disk 13a. A reaction force, which the cam disk 51 receives, is applied through the rolling bearing 33 to the input shaft 30, while the input disk 12b is pressed toward the output disk 13b. That is, the rotational movements of the input disks 12a, 12b can be transmitted from the two end sides of the input shaft 30 through the power rollers 15a-15d to the output disks 13a, 13b and can be then output from the output gear 43.

On the other hand, on the lower side of each of the power rollers 15a-15d, there is installed a valve unit 60 which is disposed in the mission case 9. The valve unit 60 is structured such that, for each of the power rollers 15a-15d, an oil pressure piston mechanism 62 is stored in a pair of valve bodies 61 assembled to the interior of the mission case 9 following the arrangement row of the power rollers 15a-15d. Specifically, each of the oil pressure piston mechanisms 62 is structured such that an oil pressure piston 64 is stored in a flat-shaped cylinder 63 so as to be movable along the trunnion axial line. And, the oil pressure piston 64 is connected to the lower trunnion shaft 19 through a drive rod 63a; and, in case where oil pressure is applied to one or the other of two cylinder chambers formed on the two sides with the oil pressure piston 64 between them, the trunnions 17a-17d can be moved upward and downward. Since the power rollers 15a-15d are offset with respect to the rotation centers of the disks 12a, 12b, 13a, 13b, the power rollers 15a-15d can be inclinedly rotated (due to the moments to be generated at the contact points between them). And, according to variations in the rotation radius ratios at the contact points between the power rollers 15a, 15b and input and output disks 12a, 13a as well as variations in the rotation radius ratios at the contact points between the power rollers 15c, 15d and the input and output disks 12b, 13b caused by the inclined rotations of the power rollers 15a-15d, the transmission ratio can be changed. By the way, to the trunnion shaft 19, there is assembled a synchronizing mechanism 68 composed of, for example, an endless wire 66 and a pulley 67 in order to be able to synchronize the inclined rotation operations of the respective power rollers 15a-15d.

In the toroidal-type continuously variable transmission, as shown in FIG. 1, to the present transmission, there is assembled a lubricating system 70 which is used to lubricate the sliding portions of the transmission that require lubrication. Also, using this lubricating system 70, there are interposed oil films between the disks 12a, 12b, 13a, 13b and the power rollers 15a-15d and, due to the shearing forces of the oil films, the power can be transmitted.

This lubricating system 70 employs a structure in which lubricating oil collecting in the oil pan part 8 is sucked up by an oil pump 71 of an engine drive type including a line filter 71a on the suction side thereof and is then pressure supplied to a plurality of systems.

Specifically, the lubricating system 70 includes, for example, the following three systems.

A. A first system in which the lubricating oil is supplied from above the variator 10 directly to the respective traction surfaces of the disks 12a, 12b, 13a, 13b and power rollers 15a-15d.

B. A second system in which the lubricating oil is guided to the bearing portions of the trunnion shafts 19 and the bearing portions of the power rollers 15a-15d and, after then, the lubricating oil is allowed to flow out to the first traction surfaces of the disks 12a, 12b, 13a, 13b.

C. A third system in which the lubricating oil is guided through the interior of the input shaft 30 to the bearing portions of the disks 12a, 12b, 13a, 13b and, after then, the lubricating oil is allowed to flow out to the first traction surfaces of the disks 12a, 12b, 13a, 13b.

The first system is a system which jets out the lubricating oil onto the respective traction surfaces of the variator 10 through the interior of a support post 73 which, as shown in FIGS. 1 and 2, supports the upper link 20 in the central portion of the cavity in such a manner that the upper link 20 can be shifted from the upper wall of the mission case 9.

Figure 4:
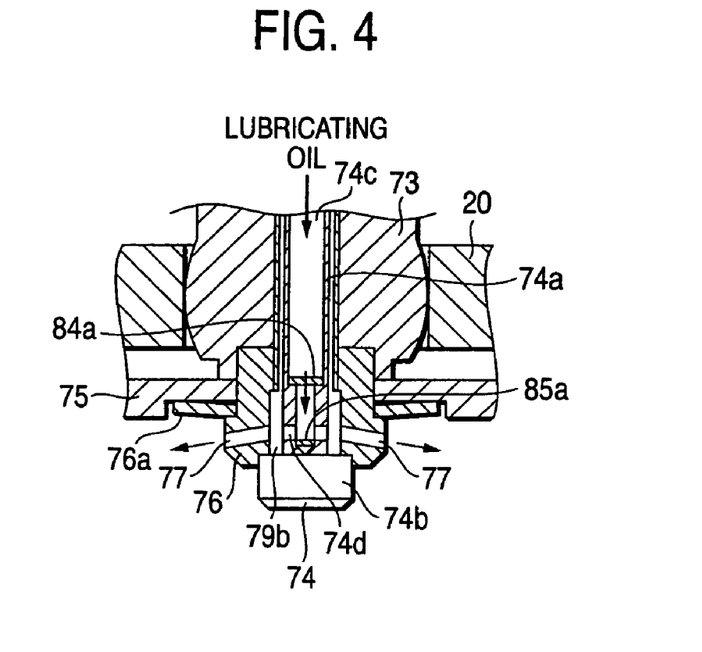
FIG. 4 is a section view of a filter structure provided in the flow-out portion of a first system (lubricating system) to be assembled to the upper portion of the cavity of the above transmission.

In detail, the leading end portion of the support post 73 penetrates through the link 20. And, to the penetrating end of the support post 73, there is fixed a stopper 75 (which is used to restrict the excessive movements of the trunnions 17a-17d) using a bolt member 74. Because the lubricating oil is jetted out through this portion, as the bolt member 74, there is used a member including a hole 74c which is formed so as to extend from the leading end of the shaft portion 74a thereof up to the neighboring point of the head portion 74b thereof; and, between the head portion 74b and the end of the support post 73, there is interposed an injection head 76 which can be fastened together with the stopper 75 using the bolt member 74. Specifically, as shown in FIG. 4, in the outer peripheral surface of the injection head 76, there are formed a plurality of obliquely downward facing injection holes 77 which face the second traction surfaces of the power rollers and the first traction surfaces of the disks. Oil passages communicating with theses injection holes 77 communicate through a ring-shaped clearance 79b and a through hole 74d formed in the root portion of the shaft portion 74a with the hole 74c of the shaft portion 74a (all of which are oil passages). And, the leading end portions of the shaft portions 74a are respectively connected to the jet-out portion of the oil pump 71 through passages 72a and thus, after the lubricating oil has passed through the line filter 71a, the lubricating oil can be jetted out to the traction surfaces. By the way, reference character 76a designates a countersunk spring which prevents the bolt member 74 against removal.

Now, the second system is a system which, as shown in FIGS. 1 and 2, using a valve body 61, can supply the lubricating oil to the traction surfaces through the interior of a drive rod 63a, the interior of the lower trunnion shaft 19 and the respective trunnions 17a-17d in this order, and then through the needle roller bearing 1, thrust bearing 28, needle roller bearing 2 and thrust ball bearing 27 in this order.

In detail, in the interior of a drive rod 63a and the interior of the lower trunnion shaft 19, there are formed passages 80a which communicate with each other and extend in the axial direction; in the interiors of the respective trunnions 17a-17d, there are formed passages 80b which extend from the exits of the passages 80a to the needle roller bearing 1; and, in the interiors of the leading-end-side shaft portions 18c (the shaft portions respectively supporting their associated power rollers 15a-15d) of the displacement shafts 18, there are formed passages 80c which respectively extend from the intermediate portions of the passages 80b up to jet-out holes 80d (FIG. 2) which are opened up in the outer peripheries of the shaft portions. And, the entrances of the passages 80a are allowed to communicate through passages 72b with the jet-out portion of the oil pump 71; and thus, the lubricating oil jetted out from the oil pump 71, that is, the lubricating oil after passage through the line filter 71a is allowed to lubricate the respective bearing portions and is then allowed to flow to the respective traction surfaces.

Now, the third system is a system in which, as shown in FIG. 3, the lubricating oil is supplied from the interior of the drive shaft member 31 through the interior of the input shaft 30 to the rolling bearing 33, ball splines 34, 37, connecting member 42 and bearings 40, 41 respectively mounted on the input shaft 30 and, after then, the lubricating oil is allowed to flow out to the respective traction surfaces.

In detail, the interior of the drive shaft member 31 is allowed to communicate through a passage 72c with the jet-out portion of the oil pump 71. Also, the drive shaft member 31 and input shaft 30 arranged in series are sealed with respect to each other through a seal member 81. Further, in the portion of the outer peripheral surface of the input shaft 30 that extends from one bearing 40 through the connecting member 42 up to the other bearing 41, there are formed a plurality of groove portions 82a. And, in the portions of the peripheral wall of the input shaft 30 that correspond to the rolling bearing 33, ball spline 34, groove portions 82a and ball spline 37, there are formed passages 82b which allow these respective parts to communicate with the interior of the input shaft 30; and thus, the lubricating oil jetted out from the oil pump 71 (that is, the lubricating oil after passage through the line filter 71a) is allowed to lubricate the respective bearing portions and is finally allowed to flow out to the traction surfaces.

On the respective exit sides of the above lubricating systems, there are disposed mesh filters which are used to remove foreign substances which exist in a block ranging from the line filter 71a to the exits (such as dust which has entered in the transmission assembling operation and remaining burrs produced in the transmission parts machining operations).

Specifically, in the first system, as shown in FIG. 4, in the upstream portion of the oil passage near to the injection hole 77, for example, in the hole portion of the bolt member 74 near to the injection head 76, there is formed a step; and, for example, a first mesh filter 84a (a surface-type filter) is installed on the step so as to close the passage. As the first mesh filter 84a, normally, there is used a filter member having a mesh (for example, about 50-200) rougher than a mesh (about 150-200) used in a line filter. Further, on the upstream portion of the oil passage near to the injection hole 77, for example, in the bottom portion of the interior of the bolt member 74 forming an oil passage portion which is used to change the flow of the lubricating oil just after the filter 84a, there is mounted a first flat-shaped magnet member 85a (a magnetic filter), so as not to hinder the flow of the lubricating oil.

Figure 5:
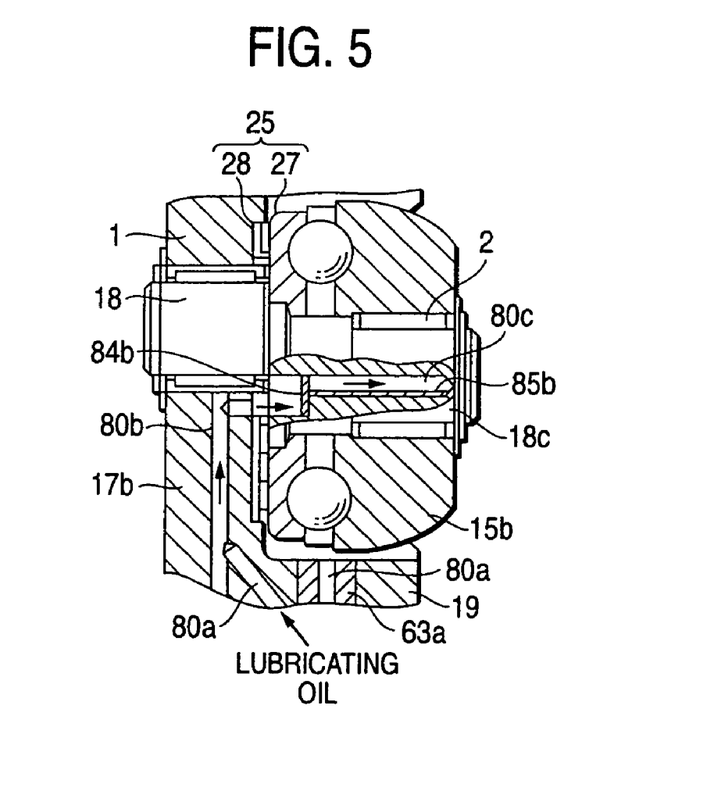
FIG. 5 is a section view of a filter structure provided in the flow-out portion of a second system (lubricating system) to be assembled to the trunnions of the transmission.

In the second system, as shown in FIG. 5, in the upstream portion of the oil passage near to the injection hole 80d (FIG. 2), for example, in the hole portion near to the injection hole 80d of the passage 80c of the displacement shaft 18, there is formed a step; and, on this step, there is mounted a second mesh-type filter 84b (a surface-type filter) having the same function as the first filter 84a, so as to occlude the passage. Further, on the upstream portion of the oil passage near to the injection hole 80d, for example, on the wall surface of the passage that is situated just after the filter 84b and is reduced in diameter, there is mounted a second flat-shaped magnet member 85b (a magnetic filter) extending along the wall surface in order not to hinder the flow of the lubricating oil.

Figure 6:
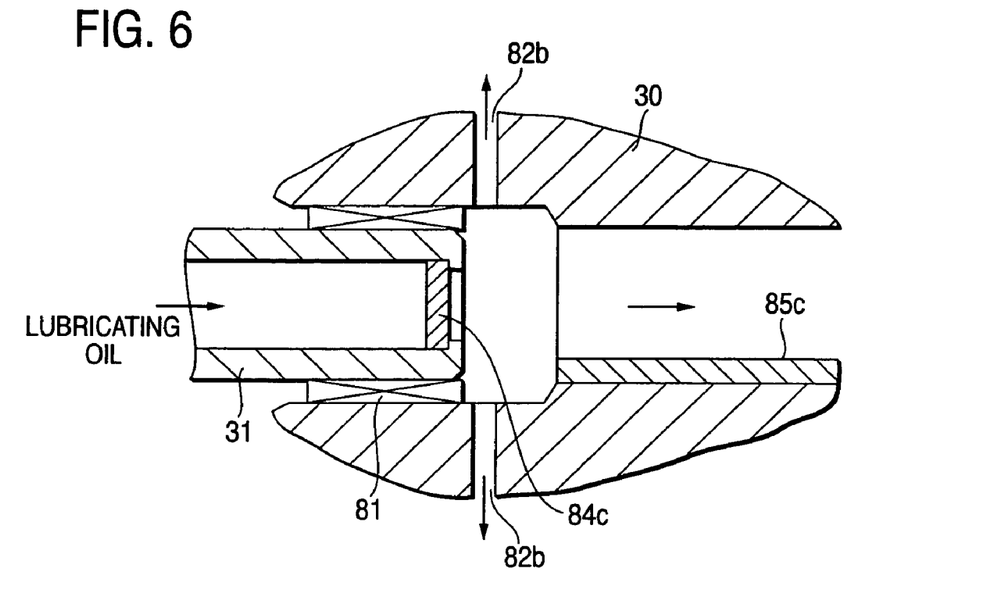
FIG. 6 is a section view of a filter structure provided in the flow-out portion of a third system (lubricating system) to be assembled to the interior of the input shaft of the transmission.
Figure 7:
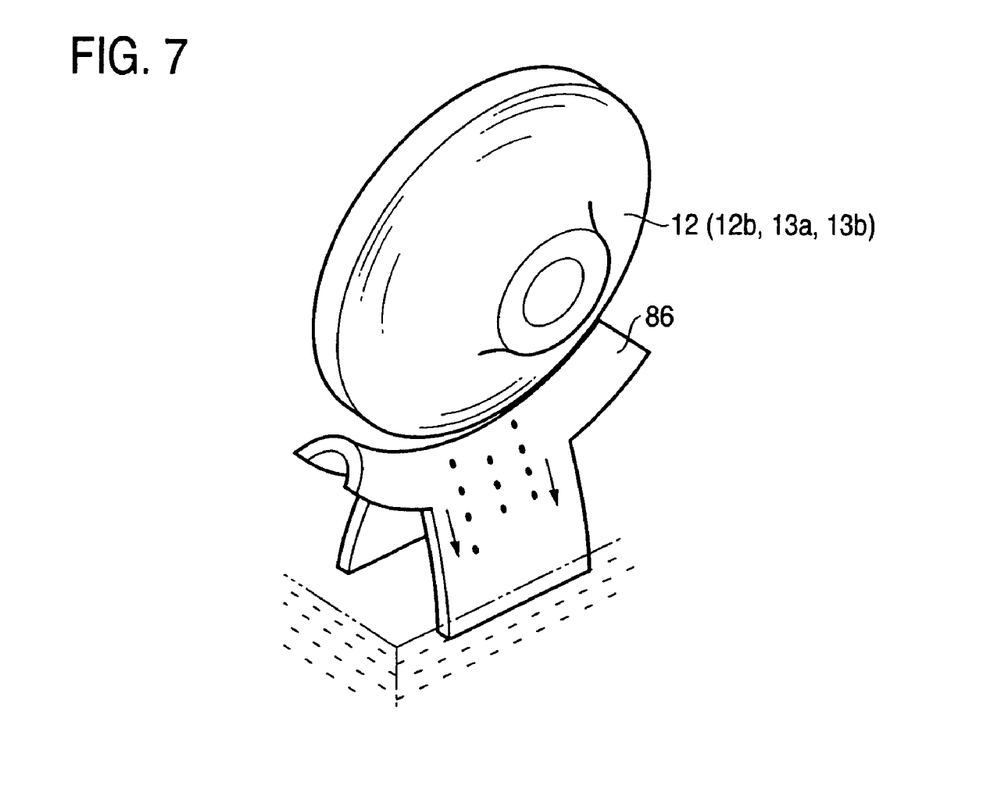
FIG. 7 is a perspective view of the structure of a cover member to be disposed below the disk of the transmission.

Now, in the third system, as shown in FIG. 6, on the upstream portion of the oil passage that is near to the most-upstream portion of the passage 82b serving as an injection hole, for example, on the tip end of the drive shaft member 31, there is mounted a third mesh filter 84c (a surface-type filter) having the same function as the first filter 84a, so as to occlude the passage. Provision of the third mesh filter 84c just before (upstream side) the passage 84b can prevent foreign substances from being mixed into the lubricating oil supplied to the rolling bearing 33. Further, on the upstream portion of the oil passage near to the portion (exit side) of the passage 82b most upstream from the line filter 71a, for example, on the wall surface of the passage of the input shaft 30 that exists just after the filter 84c and is reduced in diameter, there is mounted a third flat-shaped magnet member 85c (magnetic filter) extending along the wall surface in order not to hinder the flow of the lubricating oil.

Also, as shown in FIG. 1, under the input and output disks 12a, 12b, 13a, 13b, there are disposed cover members 86 respectively. As the cover members 86, as typically shown in FIG. 7, there is used a plate member having an almost U-shaped section. And, the outer shape of each of the cover members 86 provides a substantially fan-like shape so as to follow the shape of its associated disk. The closed side of the cover member 86 is disposed so as to be adjacent to the lower arc area of the disk 12a, while the open side of the cover member 86 is disposed so as to extend toward the lubricating oil collecting in the oil pan part 8. This cover member 86 covers the entire area of the lower portion of the disk 12a.

The above-mentioned mesh filters 84a-84c, magnet members 85a-85c, and cover members 86 protect the variator 10 against the foreign substances existing in the lubricating oil, especially the foreign substances that remain up to a portion where the lubricating oil is jetted out from the line filter 71a.

That is, referring to the flow of the lubricating oil, as the toroidal-type continuously variable transmission is put into operation, the oil pump 71 is actuated to suck up the lubricating oil of the oil pan part 8. And, the lubricating oil, which has been supplied from the oil pump 71 and has passed through the line filter 71a, is divided into the lubricating systems; part of the lubricating oil is supplied through the interior of the bolt member 74 and injection head 76 from the injection hole 77 to the first traction surfaces of the disks 12a, 12b, 13a, 13b and the second traction surfaces of the power rollers 15a-15d. Also, another part of the lubricating oil passes through the interiors of the drive rods 63, the interiors of the trunnion shafts 19 and the interiors of the trunnions 17a-17d, lubricates the needle roller bearing 1, thrust bearing 28, needle roller bearing 2 and thrust ball bearing 27 and, after then, flows out to the traction surfaces. Also, another part of the lubricating oil passes through the interiors of the drive shaft member 31, the input shaft 30 and each passage 82b, and flows onto the traction surfaces with lubricating the rolling bearing 33, ball splines 34, 37, connecting member 42 and bearings 40, 41.

In this case, it is assumed that substances such as dust which has entered in the assembling operation of the transmission and burrs produced in the machining operations of the parts thereof remain in a block extending from the line filter 71a up to the exit for the lubricating oil.

At the then time, in the oil passage (first system) which exists near to the injection hole 77, there are present the first mesh filter 84a and first magnet member 85a; in the oil passage (second system) near to the injection hole 80d, there are present the second filter mesh 84b and second magnet member 85b; and, in the oil passage (third system) on the most-upstream-side passage 82b, there are present the third mesh filter 84c and third magnet member 85c.

Therefore, the foreign substances existing in the early assembling time can be removed by the respective mesh filters 84a-84c. Also, the fine substances made of metal, which could not have been removed by the line filter 71a, can be removed through the attracting operations of the magnet members 85a-85c.

This can prevent the metal-made foreign substances existing in the early assembling time from being bitten into the rolling contact portions between the disks 12a, 12b, 13a, 13b and power rollers 15a-15d. Of course, the foreign substances mixed in the lubricating oil sucked up from the oil pan part 8 can also be removed.

Therefore, the traction surfaces of the disks 12a, 12b, 13a, 13b and the traction surfaces of the power rollers 15a-15d can be protected against the foreign substances and thus their lives can be enhanced. Also, due to the combined use of the two kinds of filters (surface-type filter, magnetic filter), the foreign substances in the lubricating oil can be removed much more and, besides, the fine metal-made foreign substances that cannot be removed by the surface filter can also be removed. That is, removal of the foreign substances can be carried out effectively. Especially, since the mesh filters 84a-84c respectively employ a rougher mesh than the line filter 71a, while the toroidal-type continuously variable transmission is in operation, there is no fear that the foreign substances can be clogged in the mesh filters 84a-84c (in case where the mesh filters are finer than the line filter 71a, there is a fear that, during the operation of the transmission, the foreign substances can collect gradually and thus can be clogged in the mesh filters, which makes it impossible for the lubricating oil to be supplied to the traction surfaces).

Further, as in the second and third systems, in case where the mesh filters are disposed at the lubricating oil entrances in the oil passages for parts such as bearings to be lubricated and the foreign substances are removed at and from such entrance portions, the biting actions of the foreign substances into the rolling surfaces of the bearings can also be prevented, thereby being able to enhance the lives of the parts such as the bearings which include the rolling surfaces.

On the other hand, it is assumed here that foreign substances have dropped into the lubricating oil collecting in the oil pan part 8 disposed below the variator.

Here, differently from the rolling surfaces of the bearings the peripheries of which are covered, the traction surfaces of the disks 12a, 12b, 13a, 13b are surfaces to be exposed and, therefore, there is a fear that the foreign substances mixed in the oil to be scraped up by the disks (such mixture of the foreign substances into the oil occurs because the surface of the lubricating oil is caused to move violently due to the vibrations of the parts of the transmission during the operation of the transmission) can be bitten into the traction surfaces of the disks as well as into the traction surfaces of the power rollers.

At the then time, the lower portions of the disks 12a, 12b, 13a, 13b are respectively covered by their associated cover members 86.

Due to this, the lubricating oil flowing down from the upper portions of the disks adheres to the cover members 86 and, as it is, flows down along the surfaces of the cover members 86; and, even in case where the lubricating oil of the oil pan part 8 moves violently, the motion of the lubricating oil is restricted by the cover members 86 and thus the lubricating oil is prevented from flowing upward, thereby being able to restrict the phenomenon that the disks scrape up the dirty lubricating oil.

Accordingly, the foreign substances in the lubricating oil can be prevented from being bitten into the traction surfaces, thereby being able to protect the traction surfaces against the dirty lubricating oil. The scrape-up restricting effect by the cover members 86 is very high and, in case where the cover members 86 are used in combination with the above-mentioned surface-type filters and magnetic filters, there can be obtained an effect that the traction surfaces can be protected fully. Since the restriction of the scrape-up operation of the lubricating oil can reduce the quantity of the lubricating oil in the peripheries of the disks, the agitation resistances in the disks 12a, 12b, 13a, 13b can be reduced and thus the efficiency of the power transmission can be enhanced.

Now, FIGS. 8A-8E respectively show a second embodiment to a sixth embodiment of a toroidal-type continuously variable transmission according to the present invention.

The respective embodiments show examples in which, in the first system, different first magnet members 85a are installed in different manners.

Figure 8A:
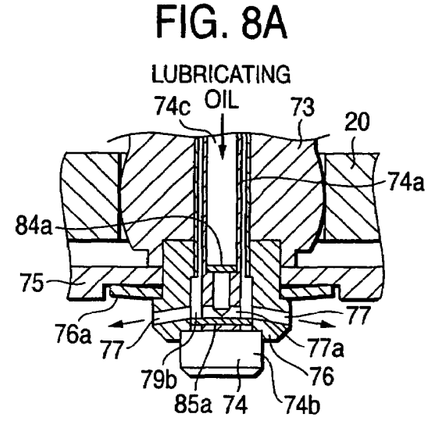
FIG. 8A is a section view of a filter structure provided in the flow-out portion of a first system (lubricating system) serving as a main part of a second embodiment according to the present invention.

Specifically, in the second embodiment shown in FIG. 8A, on the wall surface of the hole portion 77a extending at right angles to the axial direction of the bolt member 74 connecting together the injection holes 77 of the injection head 76, there is mounted a flat-shaped first magnet member 85a so as to extend along the present wall surface.

Figure 8B:
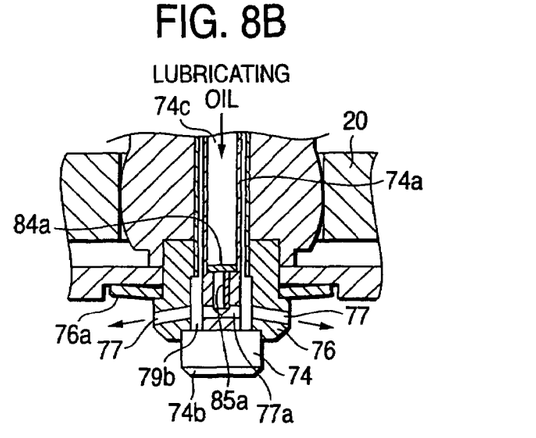
FIG. 8B is a section view of a filter structure provided in the flow-out portion of a first system (lubricating system) serving as a main part of a third embodiment according to the present invention.

In the third embodiment shown in FIG. 8B, a flat-shaped first magnet member 85a is mounted on the wall surface of the through hole having a small diameter formed just in the rear of a first mesh filter 84a.

Figure 8C:
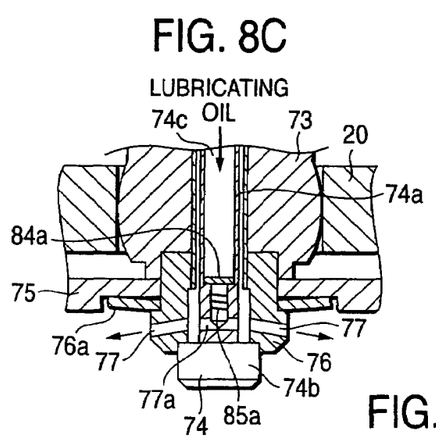
FIG. 8C is a section view of a filter structure provided in the flow-out portion of a first system (lubricating system) serving as a main part of a fourth embodiment according to the present invention.

In the fourth embodiment shown in FIG. 8C, a first magnet member 85a formed in a coil shape is stored in a through hole having a small diameter formed just in the rear of a first mesh filter 84a.

Figure 8D:
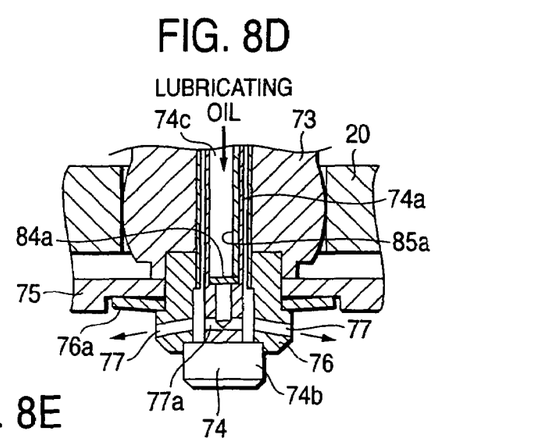
FIG. 8D is a section view of a filter structure provided in the flow-out portion of a first system (lubricating system) serving as a main part of a fifth embodiment according to the present invention.

In the fifth embodiment shown in FIG. 8D, a flat-shaped first magnet member 85a is mounted on the wall surface of a through hole having a large diameter formed in front of a first mesh filter 84a so as to extend along the present wall surface.

Figure 8E:
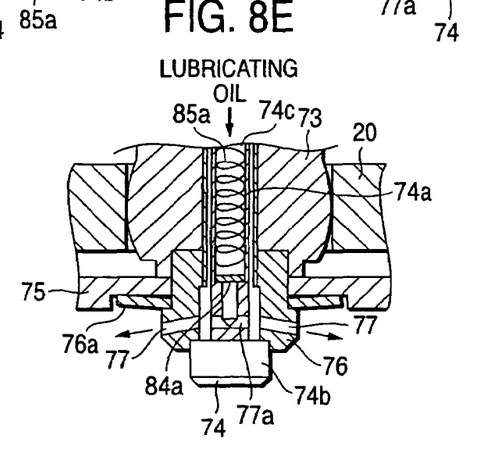
FIG. 8E is a section view of a filter structure provided in the flow-out portion of a first system (lubricating system) serving as a main part of a sixth embodiment according to the present invention.

In the sixth embodiment shown in FIG. 8E, a coil-shaped first magnet member 85a is stored in a through hole having a large diameter formed in front of a first mesh filter 84a.

In case of these respective embodiments as well, there can be obtained a similar effect to the first embodiment.

Figure 9A:
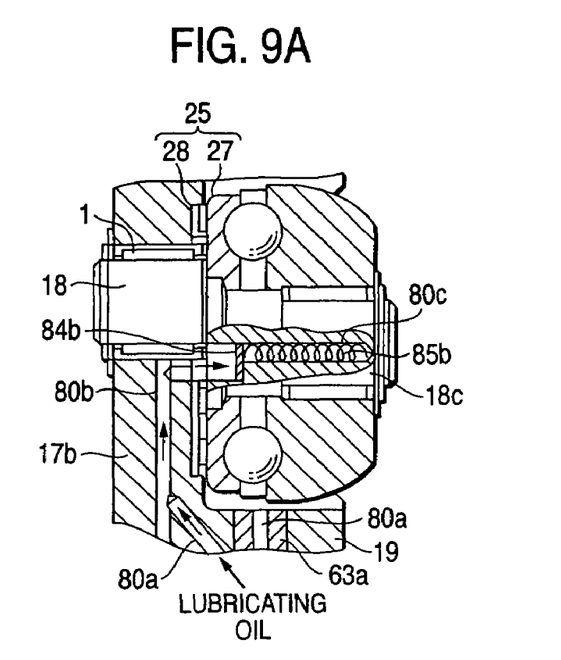
FIG. 9A is a section view of a filter structure provided in the flow-out portion of a second system (lubricating system) serving as a main part of a seventh embodiment according to the present invention.
Figure 9B:
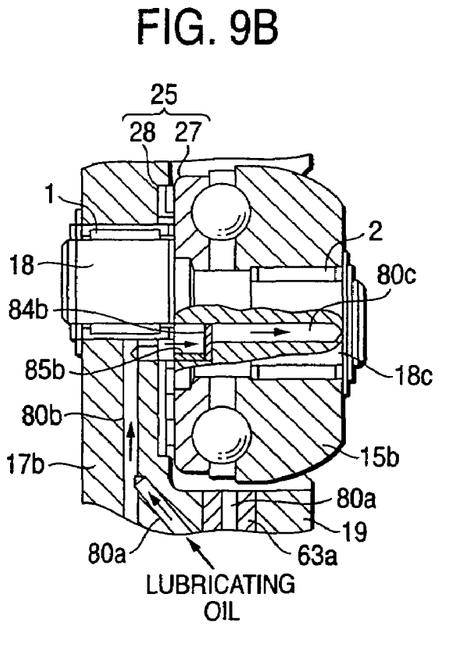
FIG. 9B is a section view of a filter structure provided in the flow-out portion of a second system (lubricating system) serving as a main part of an eighth embodiment according to the present invention.

Now, FIGS. 9A-9B respectively show seventh to ninth embodiments according to the present invention.

Figure 9C:
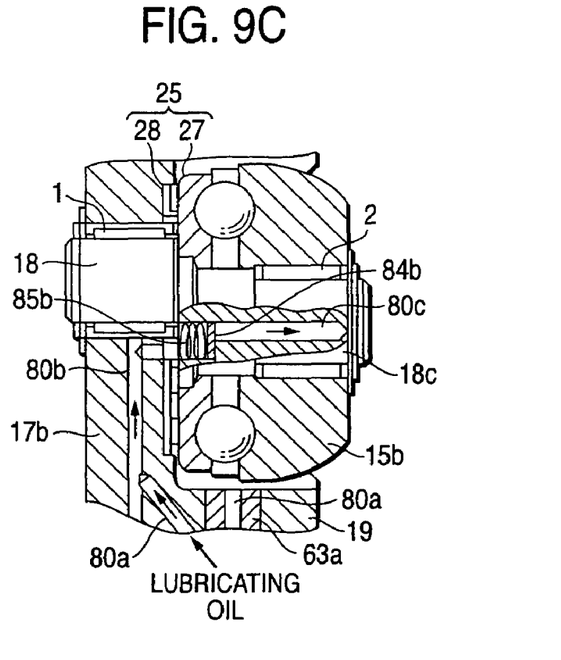
FIG. 9C is a section view of a filter structure provided in the flow-out portion of a second system (lubricating system) serving as a main part of a ninth embodiment according to the present invention.

The seventh to ninth embodiments respectively show cases in which, in the second system, different second magnet members 85b are mounted in different manners from the first embodiment.

Specifically, in the seventh embodiment shown in FIG. 9A, a coil-shaped second magnet member 85b is stored in a through hole having a small diameter formed in the rear of a second mesh filter 84b.

In the eighth embodiment shown in FIG. 9B, a flat-shaped second magnet member 85b is mounted on the wall surface of a through hole having a large diameter formed in front of a second mesh filter 84b.

In the ninth embodiment shown in FIG. 9C, a coil-shaped second magnet member 85b is stored in a through hole having a large diameter formed in front of a second mesh filter 84b.

In the case of these embodiments as well, there can be obtained a similar effect to the first embodiment.

Figure 10:
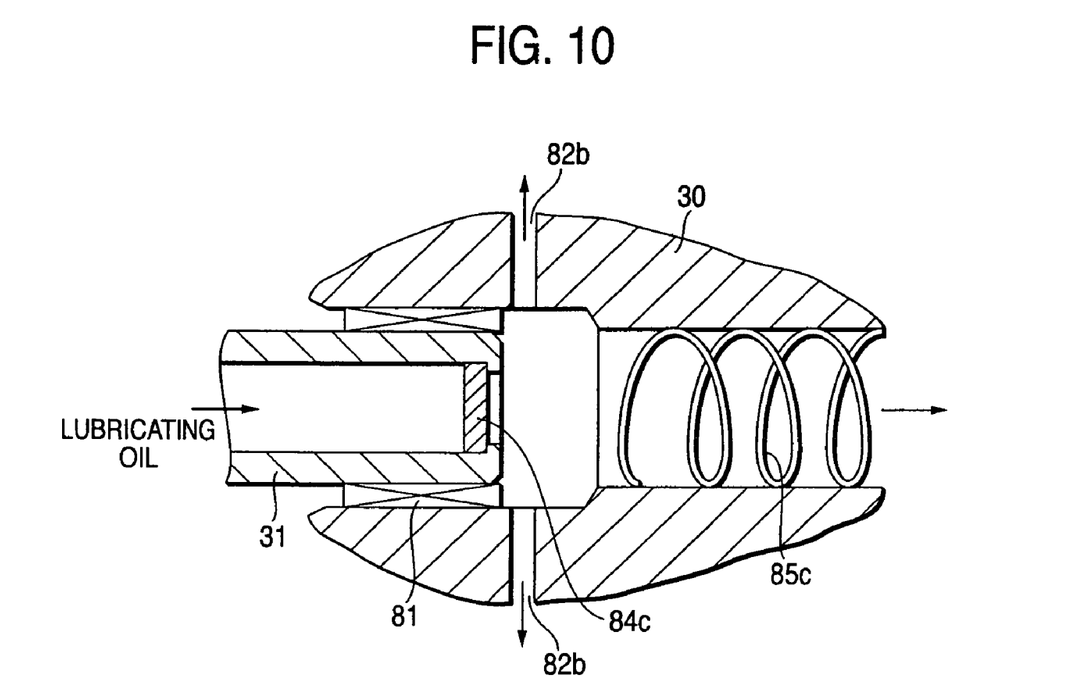
FIG. 10 is a section view of a filter structure provided in the flow-out portion of a third system (lubricating system) serving as a main part of a tenth embodiment according to the present invention.

Now, FIG. 10 shows a tenth embodiment according to the present invention.

The tenth embodiment shows an example in which, in the third system, a third magnet member 85c different from the first embodiment is installed in a different manner.

Specifically, in the tenth embodiment, a coil-shaped third magnet member 85c is stored in a passage portion which is situated just after a third mesh filter 84c and is reduced in diameter.

This embodiment has same advantage as the first embodiment.

Figure 11:
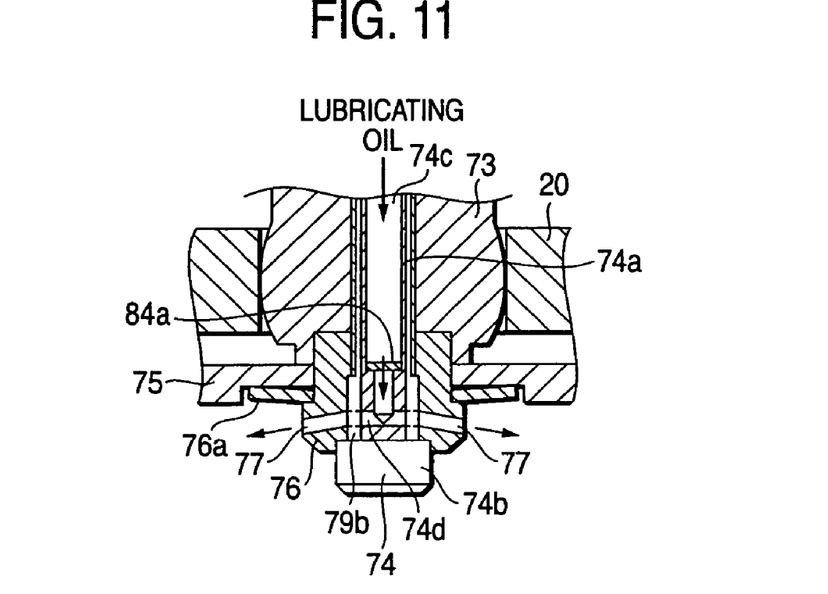
FIG. 11 is a section view of a single-type surface filter provided in the flow-out portion of a first system (lubricating system) serving as a main part of an eleventh embodiment according to the present invention.
Figure 12:
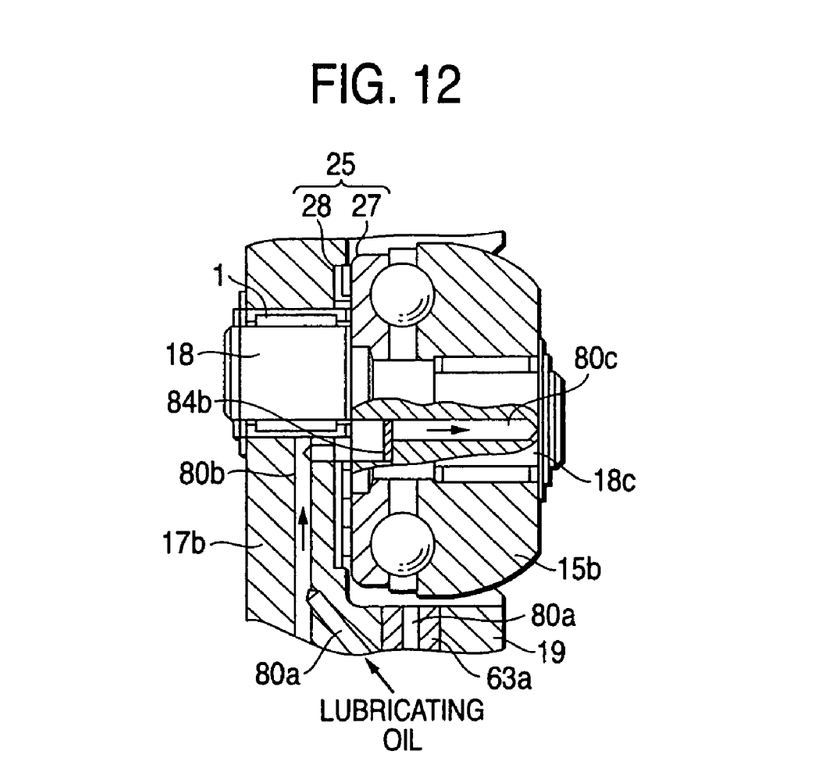
FIG. 12 is a section view of is a section view of a single-type surface filter provided in the flow-out portion of a second system (lubricating system) serving as a main part of a twelfth embodiment according to the present invention.
Figure 13:
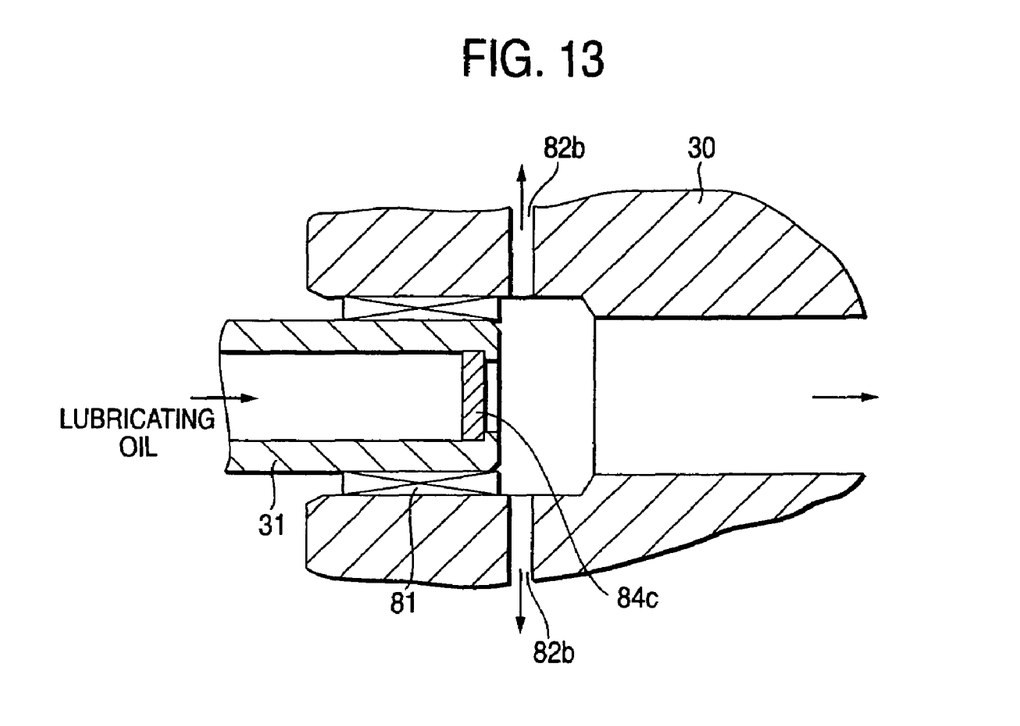
FIG. 13 is a section view of a single-type surface filter provided in the flow-out portion of a third system (lubricating system) serving as a main part of a thirteenth embodiment according to the present invention.
Figure 14:
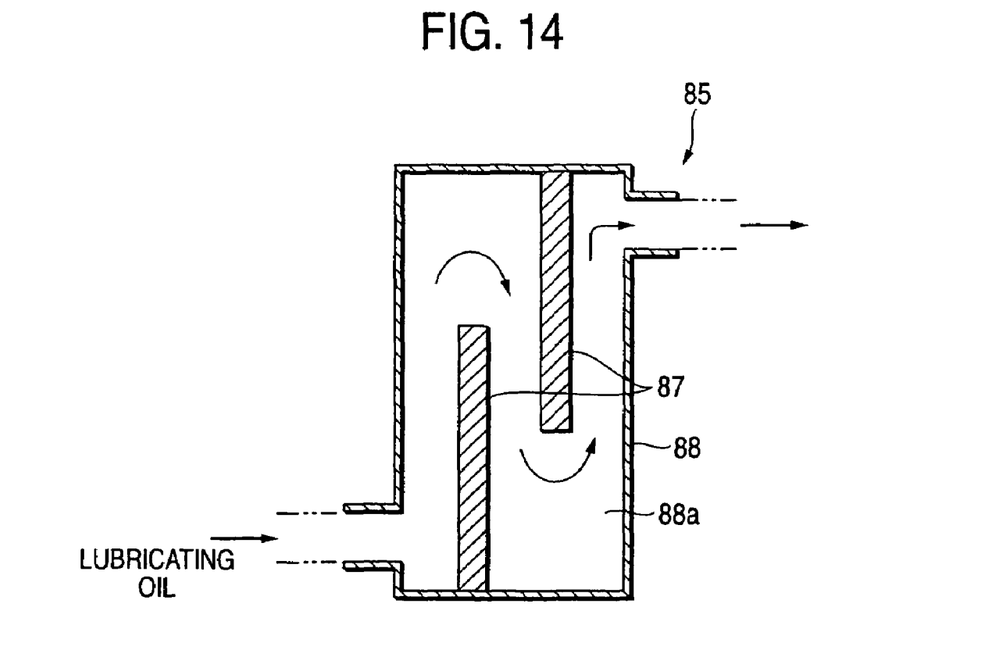
FIG. 14 is a section view of a single-type magnetic filter assembled to a portion of an oil passage serving as a main part of a fourteenth embodiment according to the present invention; and, FIG. 15 is a section view of a filter structure provided in the flow-out portion of a third system (lubricating system) serving as a main part of a fifteenth eleventh embodiment according to the present invention.

Also, the surface-type filter may not be used together with the magnetic filter. For example, as in an eleventh embodiment shown in FIG. 11, there may be employed a structure in which only the first mesh filter 84a is mounted on the injection head 76; as in a twelfth embodiment shown in FIG. 12, there may be employed a structure in which only the second mesh filter 84b is mounted on the displacement shaft 18; and, as in a thirteenth embodiment shown in FIG. 13, there may be employed a structure in which only the third mesh filter 84c is installed in the interior of the drive shaft member 31. Also, in the case of the magnetic filter 85 as well, the indispensable condition for the magnetic filer 85 is that it should be disposed in the oil passages in the lubricating systems for the lubricating oil. Especially, in case where the magnetic filter 85 is disposed downstream of a line filter 71a shown by a broken line in FIG. 1, the magnetic filter 85 can attract the metal-made foreign substances that could not be removed by the line filter 71a, thereby being able to provide a similar effect to the first embodiment. In this case, the magnetic filter 85 may preferably have a box structure according to a fourteenth embodiment shown in FIG. 14 in which a plurality of magnet members 87 are combined together to thereby form a winding flow passage 88a in the interior of a box body 88.

Figure 15:
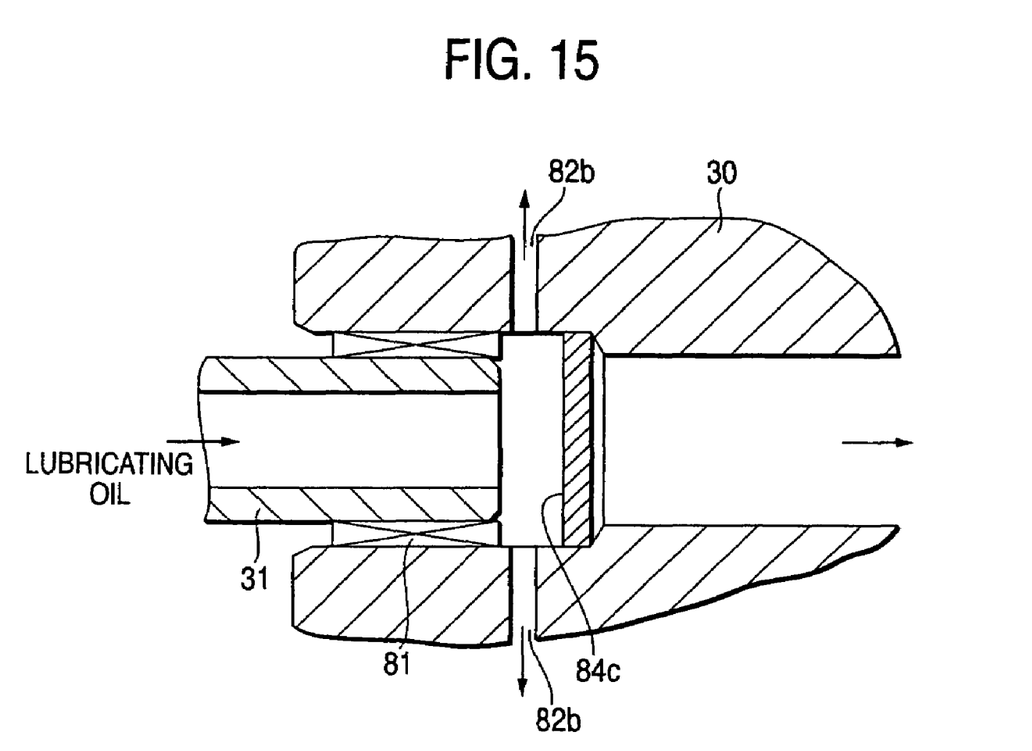

Also, as in a fifteenth embodiment shown in FIG. 15, a third mesh filter 84c in the third system may also be disposed in the upstream side of the input shaft 30, in detail, in the hole portion of the input shaft 30 situated near to the leading end of the drive shaft member 31. Specifically, as the installation structure for the third mesh filter 84c, as shown in FIG. 15, there is employed a structure in which a step is formed in the hole portion of the input shaft 30 near to the leading end of the drive shaft member 31 and the third mesh filter 84c is disposed on the step so as to be able to close the hole portion (passage). By the way, in case where the third mesh filter 84c is disposed in this portion, since the rolling bearing 33 is not rotated at a high speed, even when the foreign substances are bitten into the traction surfaces, such biting does not have a serious effect on the performance of the transmission.

Of course, in addition to the structure in which the surface-type filter and magnetic filter are disposed on the oil passage exit side, in the oil passage in the lubricating system, there can also be separately disposed a magnet member which serves as a magnetic filter.

Here, in the above-mentioned second to fifteenth embodiments, the same parts as the first embodiment are given the same designations and thus the description thereof is omitted.

By the way, in the illustrated respective embodiments, there have been shown the examples in which the present invention is applied to a half-toroidal-type continuously variable transmission. However, this is not limitative but, of course, the present invention can also be applied to a full-toroidal-type continuously variable transmission. Also, the toroidal-type continuously variable transmission may be of a double cavity type or of a single cavity type.

As has been described heretofore, according to the present invention, the foreign substances existing in the block extending from the line filter to the injection holes can be removed by the mesh filters before they are jetted out onto the traction surfaces.

Thanks to this, the foreign substances existing in the early assembling operation of the transmission can be prevented from being bitten into the rolling contact portions between the input and output disks and power rollers, which makes it possible to enhance the lives of the input and output disks and power rollers.

Also, according to the present invention, the attracting actions of the magnet members can remove the metal-made foreign substances that could not have been removed by the line filter.

This can prevent the foreign substances from being bitten into the rolling contact portions between the input and output disks and power rollers, thereby being able to enhance the lives of the input and output disks and power rollers.

Further, according to the present invention, use of the cover members can restrict the input and output disks from scraping up the dirty lubricating oil.

This can prevent the foreign substances included in the dirty lubricating oil from being bitten into the rolling contact portions between the input and output disks and power rollers, which can enhance the lives of the input and output disks and power rollers.

Still further, according to the present invention, there can be obtained an effect that the operation to protect the traction surfaces of the input and output disks as well as the traction surfaces of the power rollers can be demonstrated fully.

What is claimed is:

1. A toroidal-type continuously variable transmission, comprising:
   a pair of input and output disks each including a first traction surface;
   power rollers each including a second traction surface and respectively interposed between the first traction surfaces of the input and output disks;
   displacement shafts for supporting respective ones of the power rollers rotatably;
   an oil passage for guiding lubricating oil to the traction surfaces of the power rollers, input disk and output disk, wherein the oil passage is disposed in one of the displacement shafts and has an injection hole;
   a line filter disposed in the oil passage; and
   a filter disposed on a step formed in an exit side of the oil passage, and situated near the injection hole, wherein the filter has a rougher mesh than the line filter,
   wherein the line filter is disposed upstream to the filter with respect to the traction surfaces.

2. The toroidal-type continuously variable transmission as set forth in claim 1, further including a magnet member disposed in the associated oil passage.

3. The toroidal-type continuously variable transmission as set forth in claim 1, further including an oil collecting portion disposed below the power rollers and input and output disks, and cover members respectively disposed so as to cover the lower portions of the associated input and output disks.

4. The toroidal-type continuously variable transmission as set forth in claim 1, further including:
   a plurality of trunnions respectively swingable about the associated trunnion shafts disposed at twisted positions with respect to the center axes of the input and output disks;
   a pair of links for connecting together the associated trunnions;
   a support post for supporting the associated link so as to be shifted;
   a stopper for restricting the movements of the associated trunnions;
   a bolt member for fixing the associated stopper to the support post and including a hole extended from the leading end of the shaft portion thereof near to the head portion thereof; and,
   an injection head fixed by the associated bolt member together with the associated stopper and including an injection hole in the outer peripheral surface thereof,
   wherein each of the oil passages is formed in the associated bolt member and each of the mesh filters is mounted on a step formed in a hole portion formed in the bolt member.

5. The toroidal-type continuously variable transmission as set forth in claim 4, further including a magnet member disposed in the oil passage of the bolt member.

6. The toroidal-type continuously variable transmission as set forth in claim 1, further including a drive shaft member, wherein the oil passage is formed in the drive shaft member and the mesh filter is mounted on the leading end of the drive shaft member.

7. The toroidal-type continuously variable transmission as set forth in claim 6, further including an input shaft, wherein the magnet member is disposed on the input shaft.

* * * * *